United States Patent [19]

Bissett

[11] 4,193,609

[45] Mar. 18, 1980

[54] SKI DEVICE

[76] Inventor: Fred L. Bissett, 1300 Florence St., Aurora, Colo. 80010

[21] Appl. No.: 887,789

[22] Filed: Mar. 17, 1978

[51] Int. Cl.² .............................................. B62B 13/00
[52] U.S. Cl. .............................. 280/12 K; 280/12 KL
[58] Field of Search ................... 280/12 K, 12 H, 16, 280/25, 11.39, 12 KL

[56] References Cited

U.S. PATENT DOCUMENTS

| | | | |
|---|---|---|---|
| 2,781,200 | 2/1957 | Robinson | 280/11.39 |
| 3,325,179 | 6/1967 | Bissett | 280/12 K |
| 3,438,643 | 4/1969 | Spiehs | 280/16 |
| 3,778,077 | 12/1973 | Johnson | 280/12 K |

Primary Examiner—Robert R Song
Attorney, Agent, or Firm—Snider, Sterne & Saidman

[57] ABSTRACT

A new and improved ski device capable of operation over water, snow, ice, artificial surfaces, or the like. The unit utilizes a seat design articulated to a single runner in a fashion analogous to the spacing of foot bindings in an ordinary ski. The unit features a stremlined chassis, an anti-sway linkage, improved shock-absorbing means, and a pair of auxiliary foot-mountable short skis for stability, control, and added performance.

26 Claims, 8 Drawing Figures

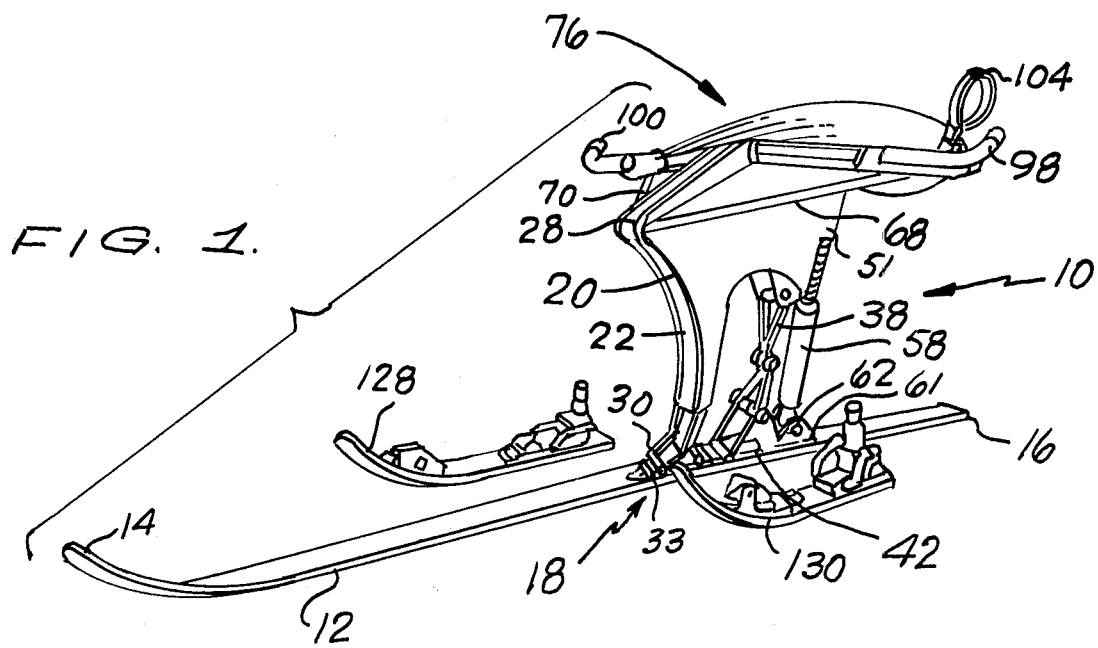
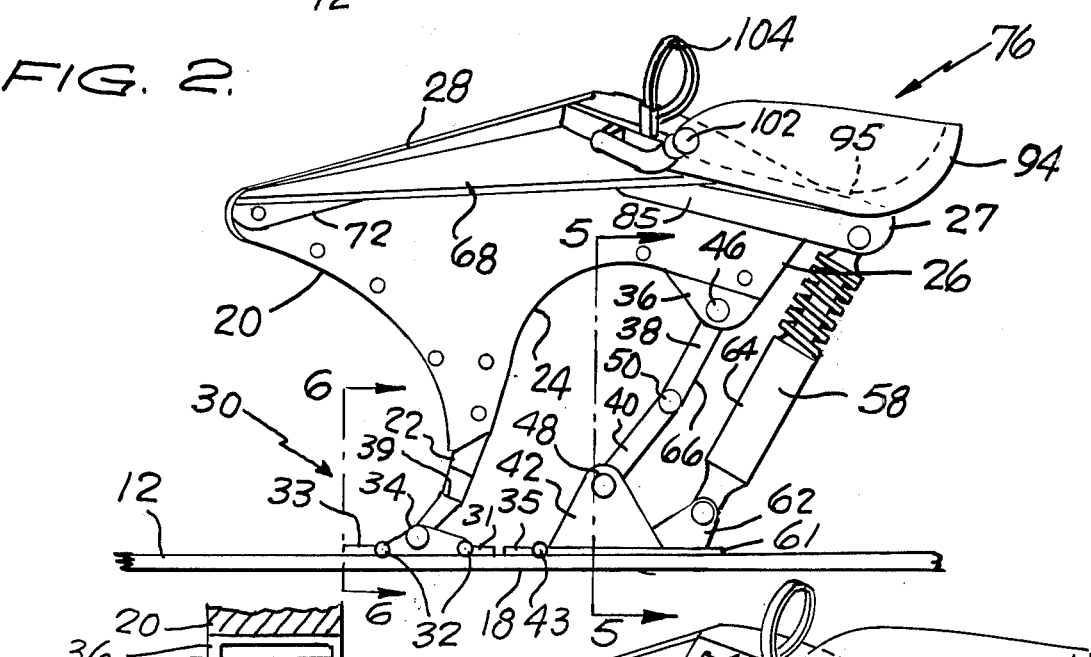
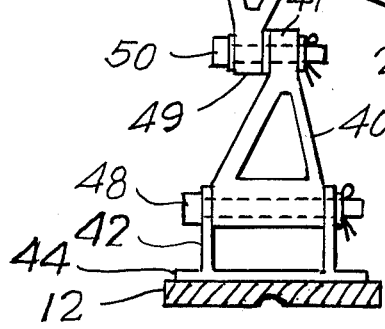
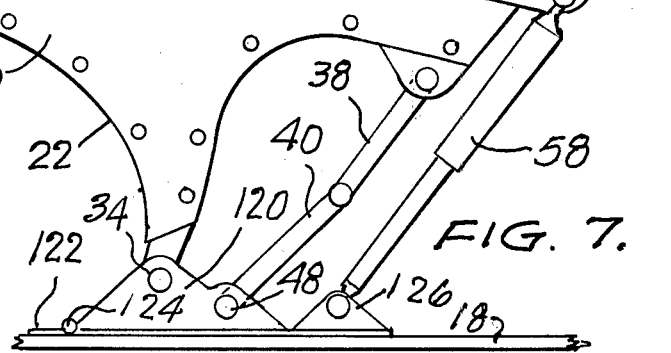

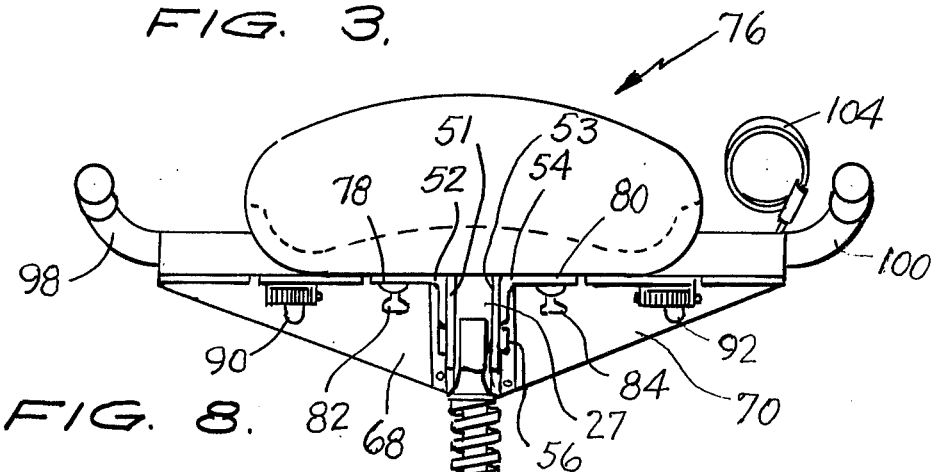
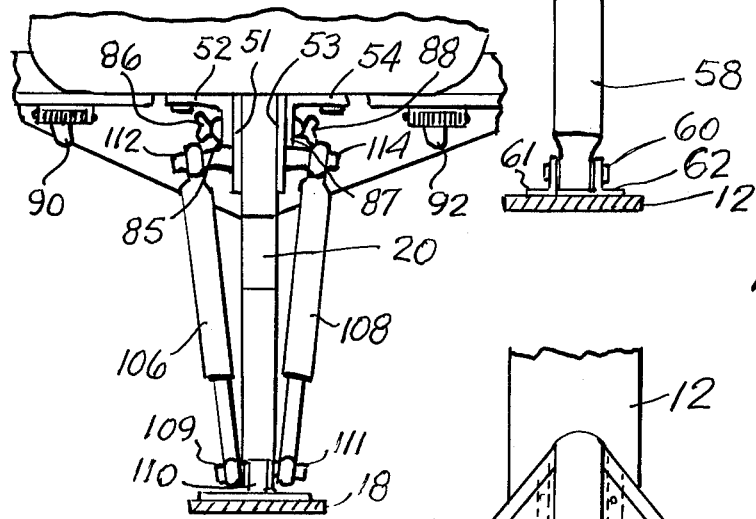
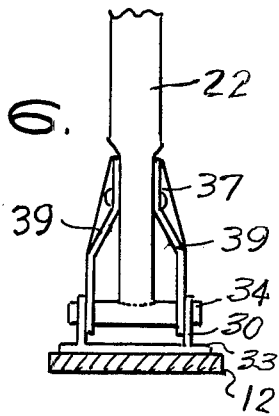
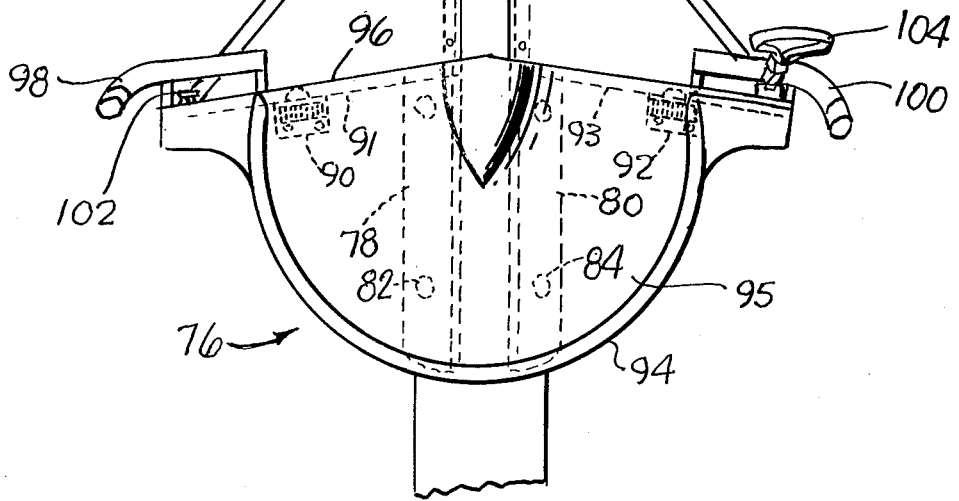

SKI DEVICE

BACKGROUND OF THE INVENTION

1. Field of the Invention

The present invention is related to ski devices or assemblies and, more particularly, is directed towards a skiing unit having a single runner upon which is mounted a seat for an operator.

2. Description of the Prior Art

My prior U.S. Pat. No. 3,325,179 teaches a ski device which has a single runner and a shock-absorbing seat structure and which is capable of operation on snow or other suitable surfaces, including water.

My prior device includes a single, relatively narrow runner 10 upon which is mounted an elongated strut 18. Mounted on the strut 18, in turn, is a forward bracket 30, a center bracket 138, and a rear bracket 114 for respectively supporting the front of the unit 50, an anti-sway linkage, and a double-acting shock-absorber. Mounted on the top of the unit 50 is a seat structure 62, and a pair of fenders 86 extended forwardly below the seat 62 adjacent the chassis 50.

The device described in my earlier patent suffers from several deficiencies. One of the major disadvantages with respect to my prior art structure is that the strut 18, mounted along almost the entire length of the runner 10, does not permit the runner 10 to flex or bend sufficiently during use. Since skis, and particularly modern skis which are constructed of fiberglass and other synthetic materials, are particularly designed to flex while in use along their entire lengths, and the provision of the strut 18 of my prior art device inhibits such flexure, the overall performance of the unit suffers greatly.

Another disadvantage of my earlier design is that the placement of the support brackets for the anti-sway linkage and the shock-absorber also inhibits ski flexure and contributes to a less efficient operating unit. Although originally believed necessary for proper support of the chassis and seat, it is clear to me that the rearward placement of the brackets detracts from, rather than enhances, the overall operation and use of the device.

Another disadvantage of the prior art device described in my earlier patent is that it can not be easily dismantled, and it is bulky, heavy, and otherwise difficult to handle, store, transport and carry. The heavy weight of the unit also detracts from performance, rather than adds stability as originally anticipated.

Another disadvantage with respect to my early design is that the single shock-absorber frequently is of insufficient strenth to handle heavy operators without bottoming out during use.

I realized, therefore, that a major overhaul of my prior design would be necessary to overcome the deficiencies and difficulties pointed out above, and the present invention is advanced as a result of such effort.

OBJECTS AND SUMMARY OF THE INVENTION

It is therefore a primary object of the present invention to provide a new and improved ski device which overcomes all of the disadvantages noted above with respect to my prior art design.

Another object of the present invention is to provide a new and unique ski device whose design, operation, feel, and performance is more closely analogous to that of a foot-operated ski than my prior design.

A further object of the present invention is to provide a new and improved ski device having a single runner and a seat structure articulated thereto and which permits the ski to flex along its entire length, thereby taking advantage of normal, expected ski action, for improved performance and control.

A still further object of the present invention is to provide a new and improved ski device having a seat structure and associated shock-absorbing means which is able to accommodate heavier loads than my prior art design.

An additional object of the present invention is to provide a novel and unique ski device of the same general character as my prior art device described above, but of a radically improved design, which is strong, durable, and easily assembled and disassembled for storage, shipping or transport.

A still further object of the present invention is to provide a unique ski device which operates in a fashion analogous to a regular foot-mounted ski, and thereby takes advantage of the design parameters of a regular ski.

Another general object of the present invention is to provide an improved ski device which is more sturdy, streamlined, structurally sound and provides better action, control and performance than my prior art device or any similar device of the same general character.

The foregoing and other objects are attained in accordance with one aspect of the present invention through the provision of a ski device, which comprises an elongated runner, seating means pivotally mounted at its forward end to the runner, anti-sway means pivotally mounted between the seating means and the runner, and shock-absorbing means pivotally mounted between and extending downwardly and forwardly from the rear portion of the seating means to the runner. The anti-sway means also preferably extends downwardly and forwardly from the seating means to the runner. The shock-absorbing means and the anti-sway means are preferably pivotally mounted to the runner at positions forwardly of the rearmost portion of the seating means in such a fashion that the distance between the rearmost and forwardmost pivotable mount on the runner is approximately the same as the distance between the front and rear foot bindings of a regular, foot-mounted ski.

In accordance with another aspect of the present invention, there are preferably further provided first, second and third mounting bracket means fastened to the upper surface of the runner to which are respectively pivotally mounted the forward end of the seating means, the anti-sway means and the shock-absorbing means. It may be said that the distance between the first and third mounting bracket means is on the same order as the distance between the toe and heel bindings of a regular, foot-mountable ski in such a fashion that the second and third mounting bracket means are positioned forwardly of the rearmost portion of the seating means. The mounting bracket means preferably includes hinged means for fastening same to the runner to enable the latter to flex in a normal fashion. In one embodiment, the hinged means comprises a first hinge for fastening the first mounting bracket means to the runner, and a second hinge for fastening the second and third mounting bracket means to the runner. In an alternate embodiment, the hinged means comprises a first hinge for fastening the first and second mounting bracket means to the runner, and a second hinge for fastening the third bracket means to the runner.

In accordance with another aspect of the present invention, the seating means comprises a vertically oriented chassis and a seat mounted to the top of the rear portion of the chassis, which portion is inclined downwardly and rearwardly from the central portion of the chassis and includes mounting bracket means for removably fastening the seat thereto. In one embodiment, the mounting bracket means comprises a pair of L-shaped brackets having one arm fastened to the chassis along the top of its rear portion, and a second arm forming a planar mount for removably attaching the seat. In an alternative embodiment, the mounting bracket means comprises a pair of L-shaped brackets having one arm fastened to the underside of the seat and a second arm which forms a mounting flange for removably fastening the seat to the chassis.

In accordance with other aspects of the present invention, the seat preferably comprises a bucket seat and includes a pair of handle means spaced forwardly from the front portion of the seat. Means are connected to the handle means of the seat for removably fastening a carrying strap thereto.

In accordance with another aspect of the present invention, the top of the front portion of the chassis is inclined downwardly and forwardly from the central portion thereof and there are further provided a pair of fenders hingedly mounted to the chassis along the top of its front portion. Each of the fenders is substantially planar and includes a rear edge which extends underneath the seat. The seat preferably includes means fastened to the underside thereof for releasably engaging the fenders which, in a preferred form, comprises a pair of spring-loaded clamps.

In accordance with other aspects of the present invention, the shock-absorbing means is pivotally mounted to the chassis underneath the seat and can comprise either a single shock-absorber or a pair of shock-absorbers symmetrically mounted about the vertical center plane of the chassis.

In accordance with another aspect of the present invention, a pair of separate, short runners having foot bindings thereon may be provided for use by an operator of the ski device for enhancing stability, poise and performance of the entire unit.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a perspective view of a preferred embodiment of the ski device of the present invention;

FIG. 2 is a partially broken, side view in elevation of the preferred embodiment illustrated in FIG. 1;

FIG. 3 is a rear view of the preferred embodiment illustrated in FIG. 2;

FIG. 4 is a partially broken, top view of the preferred embodiment illustrated in FIG. 3;

FIG. 5 is an enlarged, sectional view of certain components which comprise the anti-sway linkage of the present invention, taken along line 5—5 of FIG. 2;

FIG. 6 is another sectional view of FIG. 2 taken along line 6—6 thereof;

FIG. 7 is a side view in elevation which illustrates an alternative embodiment of the present invention; and FIG. 8 is a rear view which illustrates yet another alternative embodiment of the present invention.

DETAILED DESCRIPTION OF THE PREFERRED EMBODIMENTS

The ski device of the present invention is indicated generally by reference numeral 10 and, as will be described in greater detail hereinafter, comprises an efficient, controlable and comfortable device including a seat structure which is articulated to a single runner for tilting forwardly and rearwardly, as well as upwardly, relative to the runner, in a vertical plane, in response to variations in the contours of the medium over which the ski device 10 is operated, the movement of the seat structure being snubbed and controlled by shock-absorbing means connected between the seat assembly and the runner.

Referring more particularly to the drawings, the runner is indicated by reference numeral 12 and includes a forward, upwardly curved front end 14 and a rear end 16. The runner 12 of the ski device 10 may be comprised of any commercially manufactured ski, or may consist of a runner especially designed for the present invention. The material of runner 12 may be of any suitable natural or artificial material and may either be solid or laminated of one material or of a combination of various materials, either natural or synthetic. The runner 12 may have formed along its length either a side or bottom camber, and may have a centered bottom groove or grooves, as is common in many commercially available skis.

Mounted somewhat rearwardly of the central section 18 of the runner 12 is an upright, vertically oriented chassis 20 which includes, as perhaps best seen in FIG. 2, a forward downwardly curved edge 22, a central, rearwardly curved lower edge 24, a rear, relatively straight edge 26, a rearmost edge 27, and an upper edge 28 which extends downwardly and forwardly from the central, upper portion of the chassis 20. The chassis 20 may be constructed of any suitable, preferably lightweight, material of sufficient strength. The specific construction of chassis 20 may be solid, tubular, skeletal, or consist of a panel-covered framework, hollow body, or the like, and may be constructed of natural, laminated, synthetic or composition materials.

Fastened somewhat rearwardly of the central portion 18 of the runner 12 is a forward mounting bracket which is indicated generally by reference numeral 30. Mounting bracket 30 includes a hinged base plate 31, pivot pins 32, a hinge member 33, and a main pivot pin 34 to which the lower end of the forward edge 22 of chassis 20 is pivotally mounted. As seen in FIG. 6, the lower portion of the forward edge 22 is connected via connector 37 to a pivot bracket 39 through which pin 34 extends to pivotally secure the forward portion of the chassis 20 to the runner 12. The hinges 31 and 33, along with pivots 32, enables the chassis 20 to be more firmly attached to the ski 12 and at the same time permits a certain degree of flexibility in the ski at this position, to enhance performance of the unit.

Connected to the rear portion of the central, rearwardly curved lower edge 24 of the upright chassis 20 is another bracket 36 to which the upper arm 38 of an anti-sway linkage is pivotally attached via pivot bolt 46. As seen also in FIG. 5, the upper arm 38 includes a laterally offset lower end 49. The lower arm 40 of the anti-sway linkage includes a laterally offset upper end 41 which is pivotally secured to the offset lower end 49 of upper arm 38 via a pivot bolt 50. The lower arm 40 of the anti-sway linkage is pivotally coupled to a lower bracket 42 via a pivot bolt 48. The bracket 42 is, in turn, mounted to the hinge 35 via pivot 43 for permitting flexure of the central portion 18 of the runner 12 at this position. The anti-sway linkage inhibits motion of the ski device 10 out of the plane of the chassis 20, thereby inhibiting side-to-side motion while enhancing vertical, forward and rearward motion.

In FIG. 3, reference numerals 51 and 53 indicate the side walls of chassis 20 between which the rear edge 27 is positioned. Below edge 27, side walls 51 and 53 are spaced to accommodate the upper end of a single shock absorber 58 via a pivot bolt 56. The lower end of the shock absorber 58 is pivotally mounted to the runner 12 via a bottom bracket 62 and its associated pivot bolt 60. Bracket 62 is mounted to runner 12 preferably via a hinged plate 61, although the brackets 42 and 62 may together be mounted on a single lower hinge, as illustrated in FIG. 2.

Note in FIG. 2 that the single shock absorber 58 extends downwardly and forwardly from the rear 27 of the chassis to the runner 12 in such a fashion that its forward edge 64 is substantially parallel to the rear edge 66 of the upper link 38 of the anti-sway linkage, as well as to the edge 26 of the chassis 20. This positioning of the rear shock absorber 58, as well as of the anti-sway linkage, provides greatly improved performance of the ski device 10 of the present invention since the distance between the forwardmost positioned bracket and the rearmost positioned bracket is about the same as the distance between the toe and heel bindings of a normal, foot-mounted ski. Accordingly, the runner 12 will react to the operator of the unit 10 in much the same fashion as would the same runner to a foot skier. The runner 12 is permitted full flexure forwardly and rearwardly of the respective brackets, and some flexure therebetween, as a result of the hinges, and of the method of mounting them.

For example, the distance between the forwardmost bracket 30 and the rearwardmost bracket 62 is approximately fourteen to sixteen inches, which is on the same order as the distance between regular ski boot bindings, and are mounted somewhat rearwardly of the central portion 18 of the runner 12 to permit the runner to flex its full length forwardly and rearwardly of the brackets and thereby function and respond in much the same manner as it would for a foot-mounted skier. The curvature provided by edges 22, 24 and 26 of the chassis 20 provides a more stream-lined, lighter structure, without sacrificing strength, rigidity or integrity.

Referring now most particularly to FIGS. 3 and 4, but also illustrated in FIGS. 1 and 2, a pair of substantially triangular, planar fenders 68 and 70 extend just under the top edge 28 of the chassis 20. The purpose of the fenders 68 and 70 is to protect the rider from snow spray, water spray, or the like. The fenders 68 and 70 are respectively secured by a pair of piano hinges 72 and 74 which are mounted along the upper edge 28 of the chassis 20. Provision of the hinges 72 and 74 permit the planar fenders 68 and 70 to be lowered substantially adjacent the side walls 51 and 53 of the chassis 20 for easy transport, as will be explained in greater detail hereinafter.

A seat is indicated generally by reference numeral 76 and may be seen to preferably comprise a bucket seat 95 for added comfort, stability and control. The seat may be constructed of padded foam rubber covered by a flexible, weather-resistant material, or may be constructed of fiberglass, plastic, natural or synthetic material. The bucket style is preferred so that the inner portion 95 of the seat secures the buttocks of the rider against accidental displacement rearwardly during use. The seat 76 is attached to the chassis 20 in such a fashion so as to be angled downwardly from the central portion of the chassis to the rear in relation to the horizontal plane of the unit.

The seat 76 is, in a preferred mode, secured to the chassis by means of a pair of L-shaped brackets 52 and 54 (FIG. 3) which are themselves secured to the side walls 51 and 53 of chassis 20 and include upper, horizontally extending, planar flanges 78 and 80 through which securing means, such as, for example, thumb screws 82 and 84, may be positioned to secure seat 76 onto the brackets 52 and 54. Alternatively, as illustrated, for example, in FIG. 8, the L-shaped brackets 52 and 54 may be secured to the underside of the seat 76, and the seat may be secured by placing thumb screws 86 and 88 through the vertical flanges 85 and 87 of the brackets to the side walls 51 and 53 of the chassis 20.

Referring back to FIGS. 3 and 4, a pair of spring-loaded hinges 90 and 92 are positioned on the underside of seat 76 near the forward edge thereof for securing the rear edges 91 and 93 of the fenders 68 and 70 in their upper position. It may be appreciated from the foregoing that the seat 76 is easily removable which facilitates transport, storage and shipping of the unit. To break down the ski device 10, the spring-loaded hinges 90 and 92 are pulled back, and the fenders 68 and 70 are dropped along their hinges 72 and 74 so as to be adjacent to the sides 51 and 53 of the chassis 20. The seat 76 may then be easily detached by unscrewing thumb screws 82 and 84, or 86 and 88, as may be the case, and the entire seat removed for transport.

Positioned on the forward edges of the seat 76 are a pair of handles 98 and 100 which are spaced from the forward edge 96 of the frame 94 of the seat 76 to facilitate grasping thereof. Positioned between the handles 98 and 100 and the respective forward edge 96 of seat 76 are a pair of mounting brackets or spurs 102 to one or both of which may be attached or detached a safety strap 104 which is provided to facilitate carrying of the unit up a ski lift, for example. The spur 102 renders the strap 104 interchangeable from one handle to the other, as may be desired.

Referring now to FIG. 8, an alternative embodiment of the present invention is illustrated. In this embodiment, a pair of shock absorbers 106 and 108 are symmetrically positioned about the vertical plane through the chassis 20. The provision of two shock absorbers 106 and 108 provides additional force-restraining movement of the unit for heavier operators to prevent bottoming out of the device during use. The shock absorbers 106 and 108 may be connected to a dual lower mounting bracket 110 having a pair of downwardly angled pins 109 and 111, and may be connected to respective upper mounting pins 112 and 114 which extend laterally from side walls 51 and 53 of the chassis. The construction of the unit of FIG. 8 may, in all other respects, be the same.

Referring now to FIG. 7, another alternative embodiment of the present invention is illustrated in which the individual mounting brackets 30 and 42 of FIG. 1 are combined into a single mounting bracket 120 for pivotally connecting both the forward portion 22 of the chassis 20 and the lower arm 40 of the anti-sway linkage.

The pivot bolts are again indicated in FIG. 7 by reference numerals 34 and 48, respectively, while reference numeral 122 indicates a mounting plate hinged at 124 for the mounting bracket 120. The shock absorber 58 is, in turn, mounted to a single rear bracket 126 which is connected to the central portion 18 of the runner 12 in approximately the same position as would bracket 62 of FIGS. 1 and 2. It may also be appreciated that the dual bracket 120 of FIG. 7 may be utilized equally effectively in conjunction with the dual shock absorber embodiment of FIG. 8.

Illustrated in FIG. 1 are a pair of short side skis 128 and 130 each of which include conventional toe and heel bindings on the top surface thereof to permit an operator of the device 10 to wear same during operation. The skis 128 and 130, on the order of eighteen to twenty inches in length, enhance stability, poise and performance, and are extremely desirable. In operation, they are kept parallel to the main runner 12, approximately three inches from the outer edges thereof. The skis 128 and 130 are not necessarily used for controlling the device 10 of the present invention, but are simply intended to ride over the surface lightly to enhance overall performance.

In operation, the rider places himself firmly in the seat 76, facing forwardly, with the upper portion of his legs extending forwardly and in a generally horizontal position to the undersurface over which the device 10 is intended to be ridden. The lower leg, from the knee to the foot, may extend downwardly and at a very slight forward angle. The device is controlled in direct proportion to and as a result of body movements which produce the desired response by being transferred through the seat and chassis to the runner and consequently to the terrain being negotiated. Although steering the device may include tilting same in the direction of the desired turn, steering may also be accomplished by a down and up unweighting, sideslipping, edging and/or use of the side and bottom camber of the runner 12.

Obviously, numerous modifications and variations of the present invention are possible in light of the above teachings. It is therefore to be understood that within the scope of the appended claims, the invention may be practiced otherwise than as specifically described herein.

I claim as my invention:

1. A ski device, which comprises:
an elongated runner;
seating means pivotally mounted at its forward end to said runner;
anti-sway means pivotally mounted between said seating means and said runner; and
shock-absorbing means pivotally mounted between and extending downwardly and forwardly form the rear portion of said seating means to said runner, wherein the distance between the pivotal mount of said forward end of said seating means to said runner and the pivotal mount of said shock-absorbing means to said runner is approximately the same as the distance between the front and rear foot bindings of a regular, foot-mounted ski.

2. The ski device as set forth in claim 1, wherein said anti-sway means extends downwardly and forwardly from said seating means to said runner.

3. The ski device as set forth in claim 1, wherein said shock-absorbing means and said anti-sway means are pivotally mounted to said runner at positions forwardly of the rearmost portion of said seating means.

4. The ski device as set forth in claim 1, further comprising first, second and third mounting bracket means fastened to the upper surface of said runner to which are respectively pivotally mounted said forward end of said seating means, said anti-sway means and said shock-absorbing means.

5. The ski device as set forth in claim 4, wherein the distance between said first and third mounting bracket means is on the same order as the distance between the toe and heel bindings of a regular, foot-mounted ski.

6. The ski device as set forth in claim 4, wherein said second and third mounting bracket means are positioned forwardly of the rearmost portion of said seating means.

7. A ski device, which comprises:
an elongated runner;
seating means pivotally mounted at its forward end to said runner;
anti-sway means pivotally mounted between said seating means and said runner;
shock-absorbing means pivotally mounted between and extending downwardly and forwardly from the rear portion of said seating means to said runner; and
first, second and third mounting bracket means fastened to the upper surface of said runner to which are respectively pivotally mounted said forward end of said seating means, said anti-sway means and said shock-absorbing means, and wherein said mounting bracket means include hinged means for fastening same to said runner.

8. The ski device as set forth in claim 7, wherein said hinged means comprises a first hinge for fastening said first mounting bracket means to said runner, and a second hinge for fastening said second and third mounting bracket means to said runner.

9. The ski device as set forth in claim 7, wherein said hinged means comprises a first hinge for fastening said first and second mounting bracket means to said runner, and a second hinge for fastening said third mounting bracket means to said runner.

10. The ski device as set forth in claim 1, wherein said seating means comprises a vertically oriented chassis and a seat mounted to the top of the rear portion thereof.

11. The ski device as set forth in claim 10, wherein said top of said rear portion of said chassis is inclined downwardly and rearwardly from the central portion thereof and includes mounting bracket means for removably fastening said seat thereto.

12. The ski device as set forth in claim 11, wherein said mounting bracket means comprises a pair of L-shaped brackets having one arm fastened to said chassis along said top of said rear portion and a second arm forming a planar mount for removably attaching said seat.

13. The ski device as set forth in claim 11, wherein said mounting bracket means comprises a pair of L-shaped brackets having one arm fastened to the underside of said seat and a second arm forming a mounting flange for removably fastening said seat to said chassis.

14. The ski device as set forth in claim 11, wherein said seat comprises a bucket seat.

15. The ski device as set forth in claim 11, wherein said seat includes a pair of handle means spaced forwardly from the front portion of said seat.

16. A ski device, which comprises:

an elongated runner;

seating means pivotally mounted at its forward end to said runner;

anti-sway means pivotally mounted between said seating means and said runner;

shock-absorbing means pivotally mounted between and extending downwardly and forwardly from the rear portion of said seating means to said runner; and wherein said seating means comprises a vertically oriented chassis and a seat mounted to the top of the rear portion thereof, and wherein said top of said rear portion of said chassis is inclined downwardly and rearwardly from the central portion thereof and includes mounting bracket means for removably fastening said seat thereto; and further comprising means connected to said seat for removably fastening a carrying strap thereto.

17. The ski device as set forth in claim 11, wherein the top of the front portion of said chassis is inclined downwardly and forwardly from the central portion thereof.

18. A ski device, which comprises:

an elongated runner;

seating means pivotally mounted at its forward end to said runner;

anti-sway means pivotally mounted between said seating means and said runner;

shock-absorbing means pivotally mounted between and extending downwardly and forwardly from the rear portion of said seating means to said runner; and wherein said seating means comprises a vertically oriented chassis and a seat mounted to the top of the rear portion thereof, and wherein said top of said rear portion of said chassis is inclined downwardly and rearwardly from the central portion thereof and includes mounting bracket means for removably fastening said seat thereto; and wherein the top of the front portion of said chassis is inclined downwardly and forwardly from the central portion thereof; and further comprising a pair of fenders hingedly mounted to said chassis along said top of said front portion thereof.

19. The ski device as set forth in claim 18, wherein each of said fenders is substantially planar and includes a rear edge extending underneath said seat.

20. The ski device as set forth in claim 19, wherein said seat includes means fastened to the underside thereof for releasably engaging said fenders.

21. The ski device as set forth in claim 20, wherein said releasably engaging means comprises a pair of springloaded clamps.

22. The ski device as set forth in claim 10, wherein said shock-absorbing means is pivotally mounted to said chassis underneath said seat.

23. The ski device as set forth in claim 22, wherein said shock-absorbing means comprises a single shock absorber.

24. The ski device as set forth in claim 22, wherein said shock-absorbing means comprises a pair of shock absorbers symmetrically mounted about the vertical center plane of said chassis.

25. The ski device as set forth in claim 1, further comprising a pair of separate, short runners having foot bindings thereon and adapted to be worn by an operator of said ski device.

26. A ski device, which comprises:

an elongated runner;

seating means pivotally mounted at its forward end to said runner;

anti-sway means pivotally mounted between said seating means and said runner;

shock-absorbing means pivotally mounted between and extending downwardly and forwardly from the rear portion of said seating means to said runner; and mounting bracket means including hinged means for fastening same to the upper surface of said runner which includes pivotal mounts for said forward end of said seating means, said anti-sway means and said shock-absorbing means, wherein the distance between the forwardmost and rearmost pivotal mounts of said mounting bracket means is approximately the same as the distance between the front and rear foot bindings of a conventional, foot-mounted ski.

* * * * *